United States Patent
Maryfield et al.

(10) Patent No.: US 9,494,686 B2
(45) Date of Patent: Nov. 15, 2016

(54) HAND-HELD TARGET LOCATOR

(71) Applicant: Cubic Corporation, San Diego, CA (US)

(72) Inventors: Tony Maryfield, Poway, CA (US); Mahyar Dadkhah, San Diego, CA (US); Robert Morse, Vista, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/735,787

(22) Filed: Jun. 10, 2015

(65) Prior Publication Data

US 2015/0355328 A1    Dec. 10, 2015

Related U.S. Application Data

(60) Provisional application No. 62/010,262, filed on Jun. 10, 2014.

(51) Int. Cl.
*G01S 17/42* (2006.01)
*G01C 17/00* (2006.01)
*G01C 9/00* (2006.01)
(Continued)

(52) U.S. Cl.
CPC ........... *G01S 17/42* (2013.01); *F41G 3/02* (2013.01); *F41G 3/06* (2013.01); *G01C 9/00* (2013.01); *G01C 15/002* (2013.01); *G01C 17/00* (2013.01); *G01S 7/481* (2013.01); *G01S 7/4808* (2013.01); *G01S 7/497* (2013.01); *G01S 17/023* (2013.01); *G01S 17/06* (2013.01); *G01S 17/74* (2013.01); *F41G 1/473* (2013.01)

(58) Field of Classification Search
CPC .......... G01S 7/003; F41G 6/02; G41G 3/06; G01C 3/08
USPC ............ 356/3.01–3.15, 4.01–4.1, 5.01–5.15, 356/6–22, 28, 28.5
See application file for complete search history.

(56) References Cited

U.S. PATENT DOCUMENTS 5,825,480 A    10/1998    Udagawa
7,295,296 B1 *  11/2007    Galli .................. F41G 3/02
                                                     356/139.01

(Continued)

FOREIGN PATENT DOCUMENTS

JP    2002 236259    8/2002

OTHER PUBLICATIONS

International Search Report and Written Opinion of PCT/US2015/035153 mailed Jan. 26, 2016, all pages.

(Continued)

*Primary Examiner* — Luke Ratcliffe
(74) *Attorney, Agent, or Firm* — Kilpatrick Townsend & Stockton LLP

(57) ABSTRACT

Techniques are disclosed for laser-based target locating for measuring and displaying absolute coordinates (e.g., Global Positioning System (GPS) coordinates) for a target. Techniques include determining absolute coordinates of a laser-based target locator, and using range and other measurements (e.g., compass heading, tilt, and/or the like) to determine the absolute coordinates of a target. The laser-based target locator can then display the absolute coordinates to a user. Sensors providing the other measurements may be calibrated by first determining the absolute coordinates of an optical tag, which may be optically communicated to the laser-based target locator.

14 Claims, 7 Drawing Sheets

(51) Int. Cl.
*G01C 15/00* (2006.01)
*G01S 17/02* (2006.01)
*G01S 17/74* (2006.01)
*G01S 7/481* (2006.01)
*G01S 7/497* (2006.01)
*G01S 17/06* (2006.01)
*G01S 7/48* (2006.01)
*F41G 3/02* (2006.01)
*F41G 3/06* (2006.01)
*F41G 1/473* (2006.01)

(56) References Cited

U.S. PATENT DOCUMENTS

| | | |
|---|---|---|
| 8,275,544 B1 | 9/2012 | Wells et al. |
| 2005/0057745 A1* | 3/2005 | Bontje ................ G01C 15/002 356/139.03 |
| 2007/0057840 A1* | 3/2007 | Thomas .................... F41G 3/02 342/357.34 |
| 2011/0023578 A1 | 2/2011 | Grässer |
| 2011/0121159 A1* | 5/2011 | Mourar ..................... F41G 3/02 250/203.2 |
| 2012/0059575 A1 | 3/2012 | Hartman et al. |
| 2012/0109577 A1 | 5/2012 | Nyhart et al. |
| 2013/0046461 A1 | 2/2013 | Balloga |
| 2013/0253820 A1 | 9/2013 | Denk |
| 2015/0176948 A1 | 6/2015 | Varshneya et al. |
| 2015/0176949 A1 | 6/2015 | Varshneya et al. |

OTHER PUBLICATIONS

PCT Patent Application No. PCT/US2015/035153 filed Jun. 10, 2015, Invitation to Pay Additional Fees and, Where Applicable, Protest Fee, mailed Sep. 15, 2015, all pages.

* cited by examiner

|  | Hand Held Target Locator |
|---|---|
| *Scope Physical* | |
| Envelope Size(mm) | 90.5x51x48 |
| Volume (cm^3) | 195.8 |
| Weight(g) | 300 |
| Optical Magnification | 4x |
| Wavelength(nm) | 1550 |
| Laser Scan Coverage (Solid angle -degree) | |
| Range finding Range (m) | 10-1500 |
| Range Finder accuracy (m) | +-1.0 |
| Power Source | 1xCR123 |
| GPS Frequency | Commercial or Military |
| Target Location Accuracy 1-σ CEP ** | <1m ( at 1.5km) |
| External Interfaces | RS232 |
| Eye Safe | Unconditional Class 1 |

HAND-HELD TARGET LOCATOR

CROSS-REFERENCES TO RELATED APPLICATIONS

The present application claims benefit under 35 USC 119 (e) of U.S. Provisional Application No. 62/010,262, filed on Jun. 10, 2014, entitled "Hand-held Target Locator" which is incorporated by reference herein in its entirety.

BACKGROUND

Laser range finders are optical devices that utilize a laser beam to determine the distance, or "range," of a target. Because of their accuracy such range finders are often utilized in military applications to determine a precise distance of a target, to help determine a ballistics estimate or calculation when aiming a sniper rifle, for example. These systems, however, provide only relative distance measurements to the laser range finder.

BRIEF SUMMARY

Techniques are disclosed for laser-based target locating for measuring and displaying absolute coordinates (e.g., Global Positioning System (GPS) coordinates) for a target. Techniques include determining absolute coordinates of a laser-based target locator, and using range and other measurements (e.g., compass heading, tilt, and/or the like) to determine the absolute coordinates of a target. The laser-based target locator can then display the absolute coordinates to a user. Sensors providing the other measurements may be calibrated by first determining the absolute coordinates of an optical tag, which may be optically communicated to the laser-based target locator.

An example laser-based target locator for determining absolute coordinates of a target, according to the disclosure, comprises an observation scope configured to provide an image viewable through an eyepiece, an orientation sensor configured to obtain an angle of the target with respect to the laser-based target locator when the target is viewable through the eyepiece, and a location system configured to obtain the absolute coordinates of the laser-based target locator. The laser-based target locator further includes a laser range finder aligned with the observation scope and configured to measure a distance between the observation scope and the target when the target is viewable through the eyepiece, and a processing unit. The processing unit is communicatively coupled to the laser range finder, the orientation sensor, and the location system, the processing unit configured to determine the absolute coordinates of the target based on the distance, the angle of the target with respect to the laser-based target locator, and the absolute coordinates of the laser-based target locator.

The example laser-based target locator can include one or more of the following features. The orientation sensor can include a magnetic compass, a celestial compass, an inclinometer, a gyroscope, an accelerometer, or any combination thereof. The laser-based target locator can include a display configured to show an indication of the determined absolute coordinates of the target. The indication of the determined absolute coordinates of the target can be viewable through the eyepiece. The laser-based target locator can be further configured to optically receive information from an optical tag, the information including absolute coordinates of the optical tag. The processing unit can be further configured to compute a bias of the orientation sensor, and compensate for the bias when determining the absolute coordinates of the target. The observation scope can be configured to magnify the image viewable through the eyepiece. The laser-based target locator can comprise a communication interface coupled to the processing unit and configured to wirelessly send an indication of the determined absolute coordinates of the target to an electronic device.

An example method of determining absolute coordinates of a target with a laser-based target locator, according to the disclosure, comprises providing an image viewable through an eyepiece of an observation scope of the laser-based target locator, obtaining, with an orientation sensor, an angle of the target with respect to the laser-based target locator when the target is viewable through the eyepiece, and obtaining, with a location system, the absolute coordinates of the laser-based target locator. The method further includes measuring, with a laser range finder of the laser-based target locator, a distance between the observation scope and the target when the target is viewable through the eyepiece, and determining the absolute coordinates of the target based on the distance, the angle of the target with respect to the laser-based target locator, and the absolute coordinates of the laser-based target locator.

The example method can include one or more of the following features. The orientation sensor can include a magnetic compass, a celestial compass, an inclinometer, a gyroscope, an accelerometer, or any combination thereof. The method can include causing the laser-based target locator to display an indication of the determined absolute coordinates of the target. Causing the laser-based target locator to display an indication of the determined absolute coordinates can include causing the laser-based target locator to display the indication of the determined absolute coordinates of the target with a display viewable through the eyepiece. The method can include optically receiving information, with the laser-based target locator, from an optical tag, the information including absolute coordinates of the optical tag. The method can include computing a bias of the orientation sensor, and compensating for the bias when determining the absolute coordinates of the target. The method can include magnifying, with the observation scope, the image viewable through the eyepiece. The method can include wirelessly sending an indication of the determined absolute coordinates of the target to an electronic device.

Among other advantages, embodiments of the invention can provide for one or more of the following features: 1) much lower cost, lower weight, lower power, and smaller size than any available implementations presently available; 2) military users want a low cost, low Size, Weight and Power (SWaP) device to identify target location for tactical purposes; 3) situational awareness capabilities; 4) independent of applied wavelength; 5) pen-light sized, easy to reach into your pocket, acquire targets, and automatically display/send coordinates to others; and 6) 4× spotting scope for magnified view of the target for easy visual recognition.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

Figure 1A:
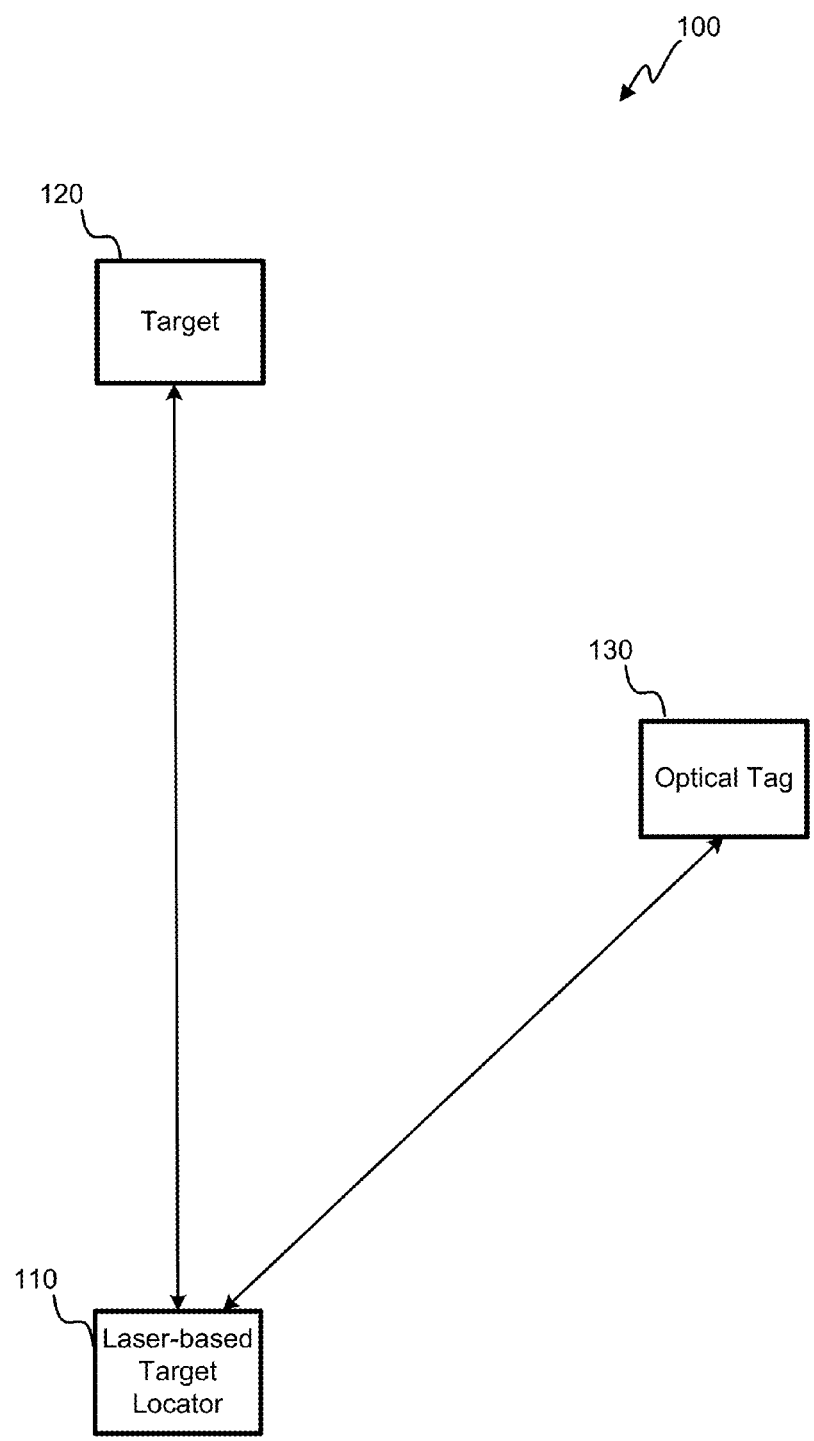
FIGS. 1A and 1B are illustrations of example setups in which such laser-based target locator described herein may be utilized.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the spirit and scope.

Laser range finders are often utilized in military applications to determine a precise distance of a target. But the determined distance may not be useful in some applications; the absolute coordinates instead may be desirable. For instance, in military applications, being able to determine the absolute coordinates (e.g., Global Positioning System (GPS) coordinates) of a target and provide this information to a user may enable the user to convey this information to others that may not be aware of the target's position, for air support, enemy tracking, and the like. Some embodiments of the present invention can include a hand-held target locator that provides, for example, a 4×scope for visualization of the intended target with a cross-hairs that when a button is pressed (or other user input is received), measures the range (using laser range finding techniques), heading, and GPS position, and displays the coordinates of the target. These coordinates can be transmitted to a smart phone (e.g., Android®, iPhone®, and the like), personal digital assistant (PDA), and/or other electronic device via a wired or wireless (e.g., Wifi®, Bluetooth®, near-field communication (NFC), etc.) connection.

Some embodiments can include one or more of the following features: the capability of target location up to 2 km in a hand-held, pen-light-sized unit with a 4× spotting scope, which may transmit the coordinates to an electronic device; operating wavelength can be conveniently provided at either 904 nm or 1550 nm, for example, for usage in both the commercial and military markets, both of which are class one eye safe; target coordinates can be transmitted to an electronic device that can show the location in a map that can be forwarded via a variety of techniques (email, text message, proprietary application, etc.) to a user and/or others; and multiple targets can be acquired in succession and identified on a map to show situational awareness. The sequential order (labeled 1 thru n) may be used as tags that can sync with photos on the electronic device.

Embodiments of the invention can be utilized, for example, in one or more of the following applications: military; hunting and game community; and/or target locating, range-finding.

It will be understood that although embodiments describe a particular type of laser-based target locating device (e.g., capable of taking GPS and range measurements), the techniques described herein may apply to other types of laser-based target locating devices as well, including rangefinders, optical communication systems, and the like. It will further be understood that a "target" as described herein can include any object for which absolute coordinates is desired. Absolute coordinates may be provided in various forms (e.g., latitude/longitude/altitude, other spherical (or even non-spherical) coordinates, etc.) by a global navigation satellite system (GNSS), such as GPS, GLONASS, BeiDou Navigation Satellite System, Galileo, and/or other positioning systems.

Figure 1B:
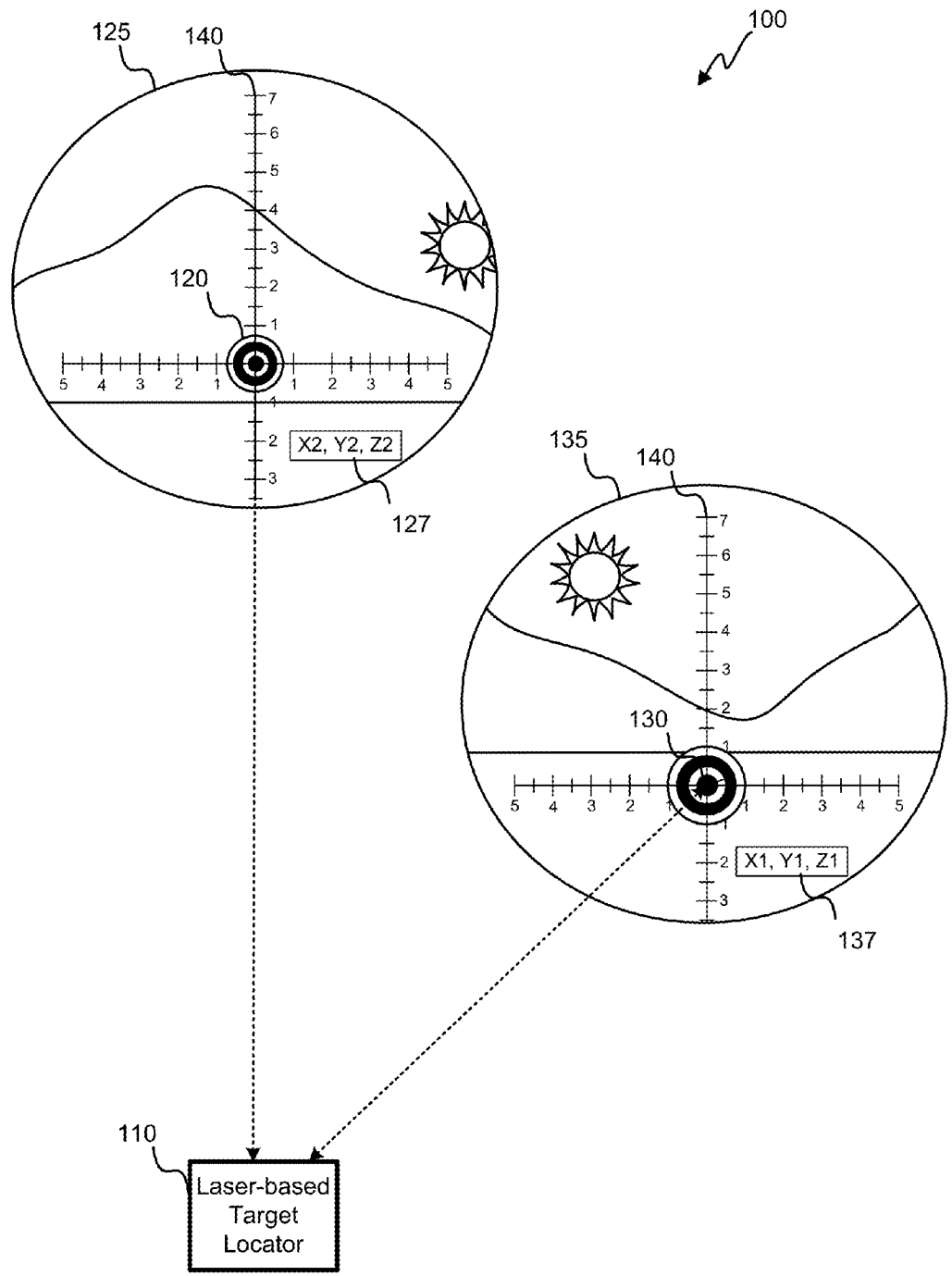

FIGS. 1A and 1B are simplified illustrations that provide an example setup 100 in which such a laser-based target locator 110 described herein may be utilized, according to an embodiment. As shown in FIG. 1A, a laser-based target locator 110 (which can be a hand-held optical device as described herein below) is co-located with a user, who aims the laser-based target locator 110 at a target 120 located some distance away. The laser-based target locator 110 is then able to provide absolute coordinates of the target 120 to the user and/or others.

Optionally, as detailed herein below, the laser-based target locator 110 may calibrate sensors (such as a compass, inclinometer, accelerometer, gyroscope, etc.) by communicating with an optical tag 130. The optical tag 130 is a device able to determine its absolute coordinates and communicate them to the laser-based target locator 110. With the absolute coordinates of the optical tag 130, the laser-based target locator 110 is then able to determine any biases on the sensors. These biases can then be taken into account when determining the absolute coordinates of the target (e.g., in subsequent measurements of the target and/or in previously-calculated measurements).

FIG. 1B is another illustration of the setup 100 of FIG. 1A, offered to provide additional clarity. Here, however, the optical tag 130 and target 120 are shown in images 135 and 125, respectively, as viewed through an observation scope of the laser-based target locator 110. As shown, the observation scope of the laser-based target locator 110 may include a cross-hairs 140 or other reticle, which may be bore-sighted with a laser such that the laser is able to provide a distance measurement (and other measurements, depending on desired functionality) of a target 120 in the cross-hairs 140.

As previously indicated, the optical tag 130 (shown in image 135 as being at the center of a circular target pattern) can be a tag capable of optically communicating its absolute coordinates to the laser-based target locator 110. The optical tag 130 may therefore have a GPS (or other GNSS) receiver to determine its absolute coordinates.

In some embodiments, the optical communication from the optical tag 130 may be provided by a modulating retro-reflector, capable of receiving an interrogation laser signal from the laser-based target locator 110 and modulating the retro-reflected laser light with information, where the information includes the absolute coordinates of the optical tag 130. Such modulating retro-reflectors are found in identification friend-or-foe (IFF) systems, an example of which can be found in U.S. Pat. No. 7,831,150 entitled "Secure Covert Combat Identification Friend-Or-Foe (IFF) System For The Dismounted Soldier," which is hereby incorporated by reference in its entirety for all purposes. In other embodiments, the optical tag may generate (rather than merely reflect) a modulated laser signal with which the absolute coordinate information may be communicated to the laser-based target locator 110.

An example of how the laser-based target locator 110 may be used is as follows. A user operating the laser-based target locator 110 may aim the laser-based target locator 110 at the target 120 by looking through the observation scope of the laser-based target locator 110 to put the target 120 in the cross-hairs 140 visible through the observation scope. (In so doing, the user would see image 125 of FIG. 1B.) The user is then able to press a button on the laser-based target locator 110 (or provide some other input) initiating a determination of the absolute coordinates of the target 120. The laser-based target locator 110 then takes one or more range measurements of the target 120 by using one or more laser range finding techniques (e.g., calculating time of flight), using a laser that is bore-sighted with the cross-hairs 140 of the optical scope. The laser-based target locator 110 also takes other measurements to help determine the absolute coordinates of the target 120, such a measurement of a heading toward which the observation scope is aimed (by using a compass), a tilt (e.g., upward or downward angle) at which the laser-based target locator 110 may be oriented (by using an accelerometer, inclinometer, and/or gyroscope), and a determination of the absolute coordinates of the laser-based target locator 110 (by using a GPS receiver). To help ensure accuracy, these measurements may be taken at substantially the same time the laser-based target locator 110 measures the distance of the target. By knowing the absolute (GPS) coordinates of the laser-based target locator 110, the relative distance of the target 120 from the laser-based target locator 110, and the heading and tilt at which the target 120 is located relative to the laser-based target locator 110, the laser-based target locator 110 may then calculate the absolute coordinates of the target 120. According to some embodiments, the laser-based target locator 110 can convey this information to the user via a display on the laser-based target locator 110 and/or by communicating the target's absolute coordinates to a device, such as a smart phone.

Continuing with the example, the user may optionally calibrate one or more sensors of the laser-based target locator 110 by communicating with an optical tag 130 to determine the absolute coordinates of the optical tag 130. For instance, the user aims the laser-based target locator 110 at the optical tag 130 and presses a button (or provides some other input) to initiate a calibration process in which the laser-based target locator 110 obtains the absolute coordinates of the optical tag 130 by generating a laser beam interrogation signal used to illuminate the optical tag 130. The optical tag 130, which includes a GPS receiver capable of determining the absolute coordinates of the optical tag 130, also includes a retro-reflector, which the optical tag uses to reflect and modulate the interrogation signal with data that includes the absolute coordinates of the optical tag 130. The laser-based target locator 110 can also take tilt, heading, and/or distance measurements of the optical tag 130, which can be taken at substantially the same time as when the absolute coordinate information of the optical tag 130 is obtained. With the absolute coordinates of the optical tag 130 and the absolute coordinates of the laser-based target locator 110, the laser-based target locator 110 is then able to calculate what heading, tilt, and/or distance readings should have been (based on the accurate absolute coordinate information provided by the GPS receives of both the optical tag 130 and the laser-based target locator 110). The laser-based target locator 110 can then determine a bias of the one or more sensors used to take the measurements, and compensate for the bias(es) in a previous and/or subsequent determination of the absolute coordinates of the target 120.

In a particular example, the user may initiate a calibration process by aiming the laser-based target locator 110 at the optical tag 130 and pressing an input. The laser-based target locator 110 then obtains the absolute coordinates X1, Y1, and Z1 (which may be latitude, longitude, and altitude) of the optical tag 130. The laser-based target locator 110 uses the absolute coordinates X1, Y1, and Z1, along with the absolute coordinates X0, Y0, and Z0 of the laser-based target locator 110 to determine the expected tilt and heading. If the heading is calculated to be 260°, but the compass reading during the calibration is 263°, the laser-based target locator 110 may then determine that the compass has a +3° bias. When the user uses the laser-based target locator 110 to determine the absolute coordinates X2, Y2, and Z2 of the target 120, the laser-based target locator 110 can take this +3° bias of the compass into account to help ensure accuracy of X2, Y2, and Z2 (e.g., by removing the bias when using measurements from the compass in calculations). Other sensors may be calibrated in a similar manner.

Depending on desired functionality, various alterations may be implemented. In some embodiments, the laser-based target locator 110 may calculate a bias of one or more sensors using a plurality of optical tags. In some embodiments, the laser-based target locator 110 may be capable of determining the absolute coordinates of a plurality of targets. This information may be provided in sequential order and/or associated as tags (e.g., labeled 1 thru n) that can sync with photos on an electronic device, such as a tablet, smartphone, or other computing device. Some embodiments may enable the laser-based target locator 110 to include a camera and/or be utilized with a separate camera to capture images. In some embodiments, the absolute coordinates of the target 120 may be provided to the user in the images 125, 135 viewable through the eyepiece, as shown by items 127 and 137 in FIG. 1B.

Figure 2A:
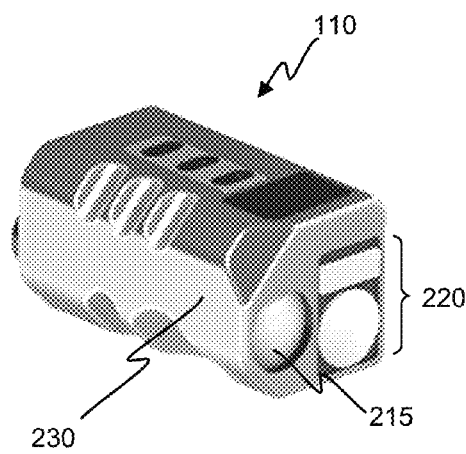
FIGS. 2A-2D are auxiliary views of a laser-based target locator for absolute coordinate determination, according to an embodiment.
Figure 2B:
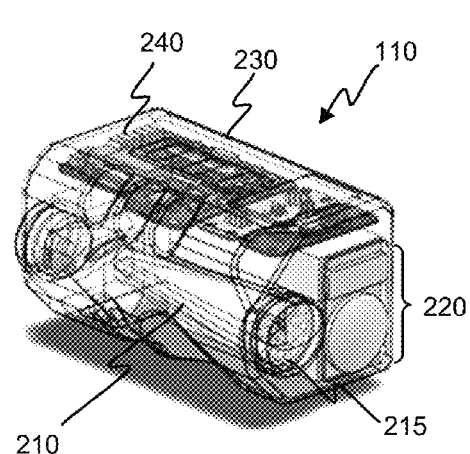
Figure 2C:
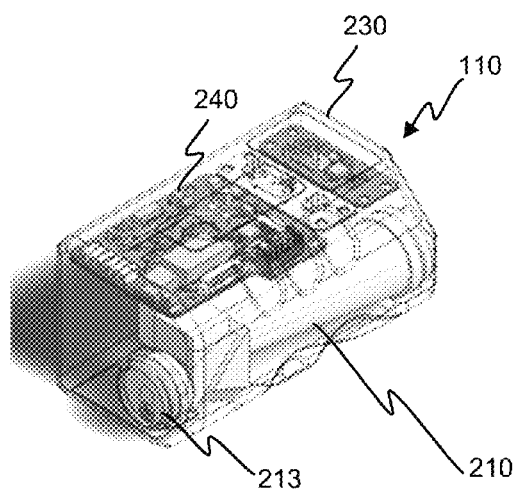
Figure 2D:
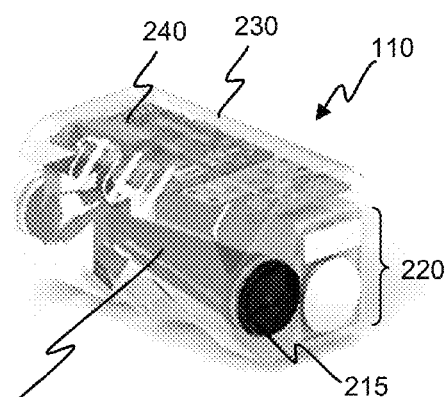

FIGS. 2A-2D are auxiliary views of a laser-based target locator 110 for absolute coordinate determination, according to an embodiment. The views show different components. FIGS. 2B-2D are shown with a transparent body to help illustrated internal components. FIGS. 2A, 2B, and 2D provide the same perspective, but with varying degrees of transparency.

As previously indicated, the laser-based target locator 110 is capable of taking laser-based range measurements, along with providing other (non-laser-based) measurements. For example, the laser-based target locator 110 can provide GPS measurement using a build-in GPS receiver, and provide orientation measurement using one or more build-in orientation sensors (e.g., compass, gyroscope, accelerometer, and the like). Other laser-based target locators may provide additional and/or alternative functions than those provided by the embodiment shown in FIG. 2. Size, weight, and/or other traits can vary, depending on desired features.

FIGS. 2A-2D illustrate an observation scope 210 through which a user may view an image of the target (such as images 125 and 135 in FIG. 1B). The image may be viewable by the user through an eyepiece 213 of the observation scope 210, and captured using an objective 215 of the observation scope 210. Depending on desired functionality, the observation scope 210 may magnify the image (e.g., provide 2×, 4×, 10×, etc. magnification) and/or provide zooming capabilities. The observation scope may further provide cross-hairs (as shown in FIG. 1B) or another type of reticle, to assist the user in aiming the laser at a target for target location and/or other laser-based measurements.

FIGS. 2A, 2B, and 2D further show optics 220 related to the transmission and reception of a laser beam, generated by an internal laser (not shown) for range finding, and (optionally) other measurements. As indicated previously the laser may not only be used in range finding, but may be used in optical communication with an optical tag (such as optical tag 130 of FIGS. 1A and 1B) to aid in calibration of one or more sensors of the laser-based target locator 110. As such, the laser transmission and receiving optics 220 and driving circuitry can be configured to communicate with laser signals by transmitting and/or receiving laser signals modulated with information.

Depending on functionality, embodiments may include a control panel with input devices (e.g., one or more buttons, switches, touchpads, touchscreens, and the like) for proving a user interface through which user input may be received. The user may provide input to initiate the automatic laser-based target location techniques described herein. Additionally or alternatively, the laser-based target locator 110 may include a display to indicate the absolute coordinates of a target. Additionally or alternatively As shown in FIG. 2B-2D, perspective views of this particular laser-based target locator 200 can circuitry 240 comprising and/or in communication with one or more orientation sensors (such as a magnetic compass, a celestial compass, an inclinometer, a gyroscope, an accelerometer, and the like), and a GPS receiver.

The body 230 of the laser-based target locator 200 and/or components housed therein can include any of a variety of materials, depending on desired functionality, manufacturing concerns, and/or other factors. It may further include an ergonomic design to aid in the handling and aiming of the laser-based target locator 110.

Figure 3:
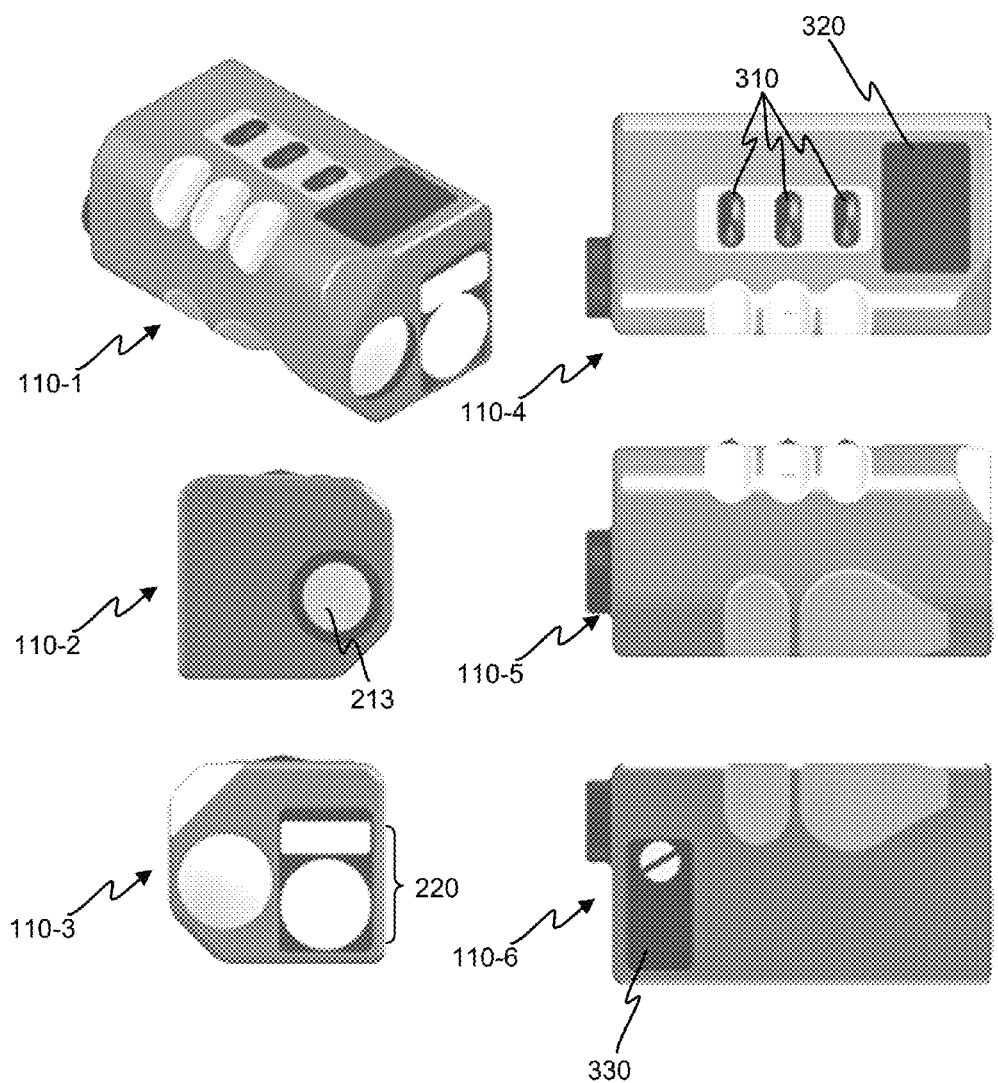
FIG. 3 illustrates the laser-based target locator of FIG. 2 at various different angles.

FIG. 3 illustrates the laser-based target locator 110 of FIG. 2 at various different angles, including a perspective view 110-1, front view 110-2 (with eyepiece 213), back view 110-3 (with objective 215 and laser optics 220), top view 110-4 (with user interface buttons 310 and GPS antenna 320), side view 110-5, and bottom view 110-6 (with tripod mount 3330)

Figure 4:
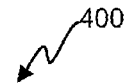
FIG. 4 is an example specification for an embodiment of a laser-based target locator, according to an embodiment.

Referring next to FIG. 4, an example specification for an embodiment of a laser-based target locator (such as the laser-based target locator 110 illustrated in FIGS. 1A-3) is provided. As shown, the range finding capabilities of the laser-based target locator can vary from 10 to 1500 m. Target location capabilities (e.g., determination of a target's absolute coordinates) can be within a meter where the target is at a distance of 1.5 km from the laser-based target locator. In some embodiments, the size of the laser-based target locator may depend on its usage. For example, the laser-based target locator may comprise a mountable body configured to be mounted or otherwise coupled to an apparatus, (e.g., weapon, optical scope, spotting scope, etc.) to which the laser-based target locator is mounted. In some embodiments, other external interface other than RS232 may be used, and other power source other than CR123 may be used. Additionally or alternatively, a wireless interface may be provided to enable the laser-based target locator to communication with one or more external devices wirelessly.

Figure 5:
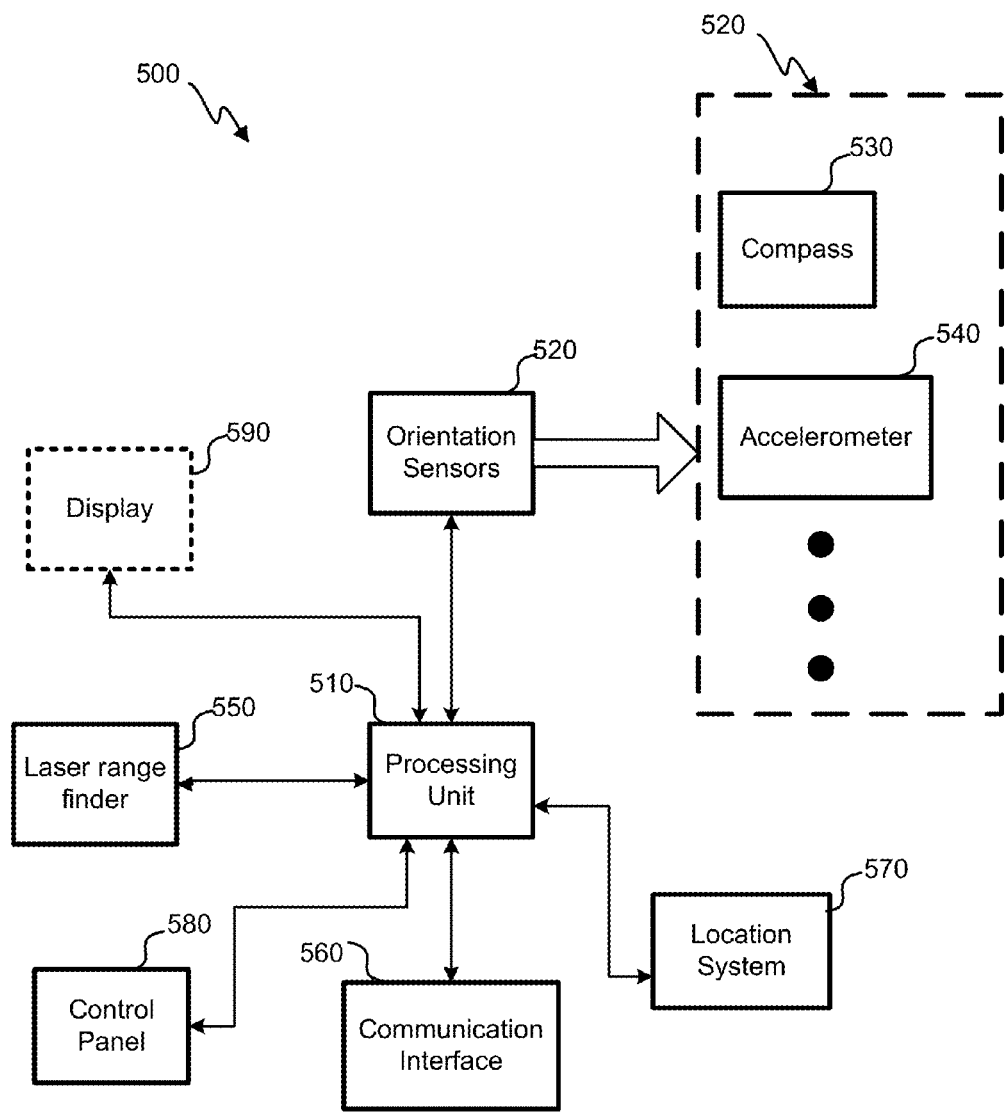
FIG. 5 is a simplified block diagram of electrical components of a laser-based target locator, according to an embodiment.

FIG. 5 is a simplified block diagram 500 of electrical components of a laser-based target locator (such as the laser-based target locator 110 of FIGS. 1A-3), according to an embodiment. As illustrated, components may include a processing unit 510, orientation sensor(s) 520 (such as compass 530, accelerometer 540, and the like), laser range finder 550, communication interface 560, GPS receiver 570, control panel 580. As shown, some embodiments may include a display 590 (shown in dashed lines as an optional component in this embodiment). Alternative embodiments may add, omit, separate, and/or combine components, depending on desired functionality. A person of ordinary skill in the art will recognize many variations.

The processing unit 510 can, among other things, manage the various electrical components, interaction with a user, and communication with one or more other devices. In some embodiments, the processing unit may communicatively couple to the laser range finder 550 and gather information from the orientation sensor(s) 520 and/or location system 570 to determine coordinates of the target based on the distance, the angle (e.g., heading and/or tilt) of the target with respect to the laser-based target locator, and the absolute coordinate of the target locator.

In some embodiments, the processing unit may further act as a ballistic computer by gathering information from the orientation sensor(s) 520, laser range finder 550, GPS receiver 570, and/or other components (including sensors that may not be illustrated) and calculating a ballistic solution. In some embodiments, the ballistic solution may be provided as an offset aim point (OAP), which may be communicated via the communication interface to an optical scope of a weapon. The processing unit may employ any combination of hardware and/or software to perform the functions described herein.

Orientation sensor(s) 520 can vary, depending on desired functionality. For example, orientation sensor(s) 520 can include a compass (e.g., a magnetic compass or celestial compass) gyroscope, accelerometer, inclinometer, and/or other systems to sense the azimuth, elevation, heading, and other orientation information regarding the laser-based target locator. Location system 570 can include systems such as a GPS receiver and/or other Global Navigation Satellite System (GNSS) as detailed above, or other positioning systems capable of providing the absolute coordinates of the laser-based target locator. Other sensors and components also can be communicatively coupled to the laser-based target locator (e.g., via the communication interface 560).

As previously indicated, the display 590 can be used to provide—in addition or as an alternative to an optical scope—an image to a user of the target and/or determined absolute coordinates thereof. Additionally or alternatively, the display 590 can provide a graphical user interface. The image shown on the display can be obtained and/or derived from an image captured by the observation scope (e.g. observation scope 210 in FIGS. 2A-2D) or one or more built-in cameras. In some embodiments, a user may navigate through a user interface shown on the display 590 by pressing one or more buttons on a control panel 580. In some embodiments, a touchscreen display 590 may be employed in addition or as an alternative to the control panel 580.

The communication interface 560 can be used to communicate with one or more other devices. As previously indicated, communication can be wireless (e.g., using radio frequency (RF), infrared signals, etc.), wired, optical, or the like. The communication interface 560 may utilize a communication port on the body of the laser-based target locator. Devices with which the laser-based target locator may communicate can include a riflescope display, a spotting scope, a smart phone (or other mobile electronic device), and the like.

Figure 6:
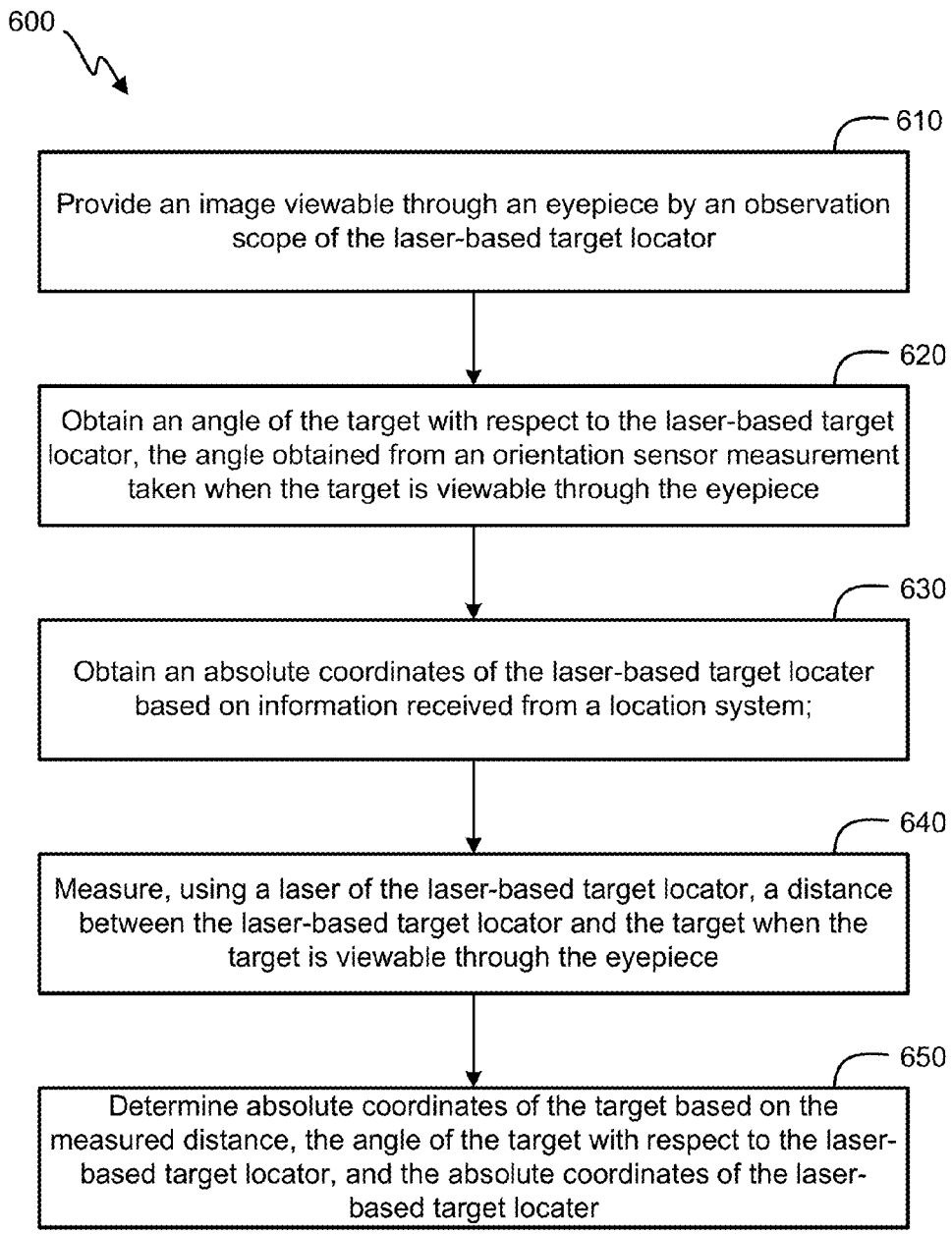
FIG. 6 is a flow diagram illustrating a method of determining absolute coordinates of a target using a laser-based target locator, according to an embodiment.

FIG. 6 is a flow diagram 600 of a method of determining absolute coordinates of a target using a laser-based target locator, according to an embodiment. As with other figures provided herein, FIG. 6 is provided as a non-limiting example. Alternative embodiments may include additional functionality to that shown in the figure, and/or the functionality shown in one or more of the blocks in the figure may be omitted, combined, separated, and/or performed simultaneously. Means for performing the functionality of the blocks may include one or more hardware and/or software components, such as those shown in FIG. 5. A person of ordinary skill in the art will recognize many variations.

The method can begin at block 610, where an image viewable through an eyepiece by an observation scope of the laser-based target locator is provided. As shown in FIGS. 2-3, embodiments of a laser-based target locator can provide an observation scope by which a user may aim the laser-based target locator at a target viewable through an eyepiece using, for example, cross-hairs, as shown in FIG. 1B.

At block 620 an angle of the target with respect to the laser-based target locator is obtained. The angle is obtained from an orientation sensor measurement taken when the target is viewable through the eyepiece. As indicated elsewhere herein, the orientation sensor could include one or more of magnetic compass, a celestial compass, an inclinometer, a gyroscope, or an accelerometer. In some embodiments, the angle may be computed by a processing unit using raw data provided by the orientation sensor. In some embodiments, the orientation sensor may provide the angle to a processing unit.

At block 630, absolute coordinates of the laser-based target locator are obtained, based on information received from a location system. A location system can include a GPS or other GNSS receiver, as previously indicated. In some embodiments, the absolute coordinates may be computed by a processing unit using raw data provided by the location system. In some embodiments, the location system may provide the absolute coordinates to a processing unit.

At block 640 a laser of the laser-based target locator is used to measure a distance between the laser-based target locator and the target, when the target is viewable through the eyepiece. Here, traditional laser-based range-finding techniques may be used to determine the distance of the target. The functionality of blocks 620, 630, and/or 640 may be executed by the laser-based target locator at substantially the same time to help ensure measurements and absolute coordinates correlate to a particular target and a particular orientation of the laser-based target locator.

At block 650, the absolute coordinates of the target are determined, based on the measured distance, the angle of the target with respect to the laser-based target locator, and the absolute coordinates of the laser-based target locator. As indicated elsewhere herein, the absolute coordinates may be conveyed to a user or a device using a display viewable to a user through the eyepiece of the observation scope, a display embedded in or otherwise coupled to the body of the laser-based target locator, and/or via communications (wired and/or wireless) to another device.

Depending on desired functionality and/or application, other techniques may be used. One or more orientation sensors may be calibrated using the calibration process described herein above, in communication with an optical tag. It will be understood that, as used herein, the term "optical tag" has been used to describe a device capable of communicating to the laser-based target locator using optical signals. Such signals can include modulated, retro-reflected laser light from a laser beam generated by the laser-based target locator.

It will be understood that although embodiments describe obtaining absolute coordinates of a target, embodiments are not so limited. According to some embodiments, relative coordinates may be obtained using the same data, in conjunction with a map and/or other location information that can be used to translate absolute coordinates of the laser-based target locator (and/or the target) to the coordinate system utilized in the map and/or other location information.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation.

Computer programs incorporating various features of the present invention may be encoded on various computer readable storage media; suitable media include magnetic media, optical media, flash memory, and the like. Non-transitory computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

While the principles of the disclosure have been described above in connection with specific embodiments, it is to be clearly understood that this description is made only by way of example and not as limitation on the scope of the disclosure. Additional implementations and embodiments are contemplated. For example, the techniques described herein can be applied to various forms of optical devices, which may comprise a smaller portion of a larger optical system. Yet further implementations can fall under the spirit and scope of this disclosure.

What is claimed is:

1. A laser-based target locator for determining absolute coordinates of a target, the laser-based target locator comprising:
    an observation scope configured to provide an image viewable through an eyepiece;
    an orientation sensor configured to obtain an angle of the target with respect to the laser-based target locator when the target is viewable through the eyepiece;
    a location system configured to obtain the absolute coordinates of the laser-based target locator;
    a laser range finder aligned with the observation scope and configured to measure a distance between the observation scope and the target when the target is viewable through the eyepiece; and
    a processing unit communicatively coupled to the laser range finder, the orientation sensor, and the location system, the processing unit configured to determine the absolute coordinates of the target based on the distance, the angle of the target with respect to the laser-based target locator, and the absolute coordinates of the laser-based target locator;
    wherein the laser-based target locator is configured to optically receive information from an optical tag, the information including absolute coordinates of the optical tag.

2. The laser-based target locator for determining absolute coordinates of a target of claim 1, wherein the orientation sensor includes:
   a magnetic compass,
   a celestial compass,
   an inclinometer,
   a gyroscope,
   an accelerometer,
   or any combination thereof.

3. The laser-based target locator for determining absolute coordinates of a target of claim 1, further comprising a display configured to show an indication of the determined absolute coordinates of the target.

4. The laser-based target locator for determining absolute coordinates of a target of claim 3, wherein the indication of the determined absolute coordinates of the target is viewable through the eyepiece.

5. The laser-based target locator for determining absolute coordinates of a target of claim 1, wherein the processing unit is further configured to:
   compute a bias of the orientation sensor, and
   compensate for the bias when determining the absolute coordinates of the target.

6. The laser-based target locator for determining absolute coordinates of a target of claim 1, wherein the observation scope is configured to magnify the image viewable through the eyepiece.

7. The laser-based target locator for determining absolute coordinates of a target of claim 1, further comprising a communication interface coupled to the processing unit and configured to wirelessly send an indication of the determined absolute coordinates of the target to an electronic device.

8. A method of determining absolute coordinates of a target with a laser-based target locator, the method comprising:
   providing an image viewable through an eyepiece of an observation scope of the laser-based target locator;
   optically receiving information, with the laser-based target locator, from an optical tag, the information including absolute coordinates of the optical tag;
   obtaining, with an orientation sensor, an angle of the target with respect to the laser-based target locator when the target is viewable through the eyepiece;
   obtaining, with a location system, the absolute coordinates of the laser-based target locator;
   measuring, with a laser range finder of the laser-based target locator, a distance between the observation scope and the target when the target is viewable through the eyepiece; and
   determining the absolute coordinates of the target based on the distance, the angle of the target with respect to the laser-based target locator, and the absolute coordinates of the laser-based target locator.

9. The method of determining absolute coordinates of a target with a laser-based target locator of claim 8, wherein the orientation sensor includes:
   a magnetic compass,
   a celestial compass,
   an inclinometer,
   a gyroscope,
   an accelerometer,
   or any combination thereof.

10. The method of determining absolute coordinates of a target with a laser-based target locator of claim 8, further comprising causing the laser-based target locator to display an indication of the determined absolute coordinates of the target.

11. The method of determining absolute coordinates of a target with a laser-based target locator of claim 10, wherein causing the laser-based target locator to display an indication of the determined absolute coordinates includes causing the laser-based target locator to display the indication of the determined absolute coordinates of the target with a display viewable through the eyepiece.

12. The method of determining absolute coordinates of a target with a laser-based target locator of claim 8, further comprising:
   computing a bias of the orientation sensor, and
   compensating for the bias when determining the absolute coordinates of the target.

13. The method of determining absolute coordinates of a target with a laser-based target locator of claim 8, further comprising magnifying, with the observation scope, the image viewable through the eyepiece.

14. The method of determining absolute coordinates of a target with a laser-based target locator of claim 8, further comprising wirelessly sending an indication of the determined absolute coordinates of the target to an electronic device.

* * * * *